(12) United States Patent
Klee

(10) Patent No.: US 12,401,095 B2
(45) Date of Patent: Aug. 26, 2025

(54) BUSBAR FOR A BATTERY

(71) Applicant: Viessmann Climate Solutions SE, Allendorf (DE)

(72) Inventor: Hanspeter Klee, Wetter (DE)

(73) Assignee: Viessmann Climate Solutions SE, Allendorf (DE)

( * ) Notice: Subject to any disclaimer, the term of this patent is extended or adjusted under 35 U.S.C. 154(b) by 482 days.

(21) Appl. No.: 17/766,275

(22) PCT Filed: Nov. 26, 2020

(86) PCT No.: PCT/EP2020/083472
§ 371 (c)(1),
(2) Date: Apr. 4, 2022

(87) PCT Pub. No.: WO2021/110527
PCT Pub. Date: Jun. 10, 2021

(65) Prior Publication Data
US 2023/0275325 A1 Aug. 31, 2023

(30) Foreign Application Priority Data

Dec. 2, 2019 (DE) ...................... 10 2019 132 709.1

(51) Int. Cl.
*H01M 50/505* (2021.01)
*H01M 50/516* (2021.01)
(Continued)

(52) U.S. Cl.
CPC ....... *H01M 50/505* (2021.01); *H01M 50/516* (2021.01); *H01M 50/522* (2021.01); *H01M 50/526* (2021.01)

(58) Field of Classification Search
CPC ............. H01M 50/505; H01M 50/516; H01M 50/522; H01M 50/526
(Continued)

(56) References Cited

U.S. PATENT DOCUMENTS

2015/0050532 A1\* 2/2015 Waigel .............. H01M 10/6561
429/61
2015/0072210 A1 3/2015 Waigel et al.
(Continued)

FOREIGN PATENT DOCUMENTS

| DE | 10 2013 213 540 A1 | 1/2015 |
| DE | 10 2016 116 581 A1 | 3/2018 |
| WO | WO 2013131588 A2 | 9/2013 |

OTHER PUBLICATIONS

Office Action dated Apr. 20, 2023 for German App. Ser. No. 10 2019 132 709.1, with English translation.
(Continued)

*Primary Examiner* — Allison Bourke
*Assistant Examiner* — Robert Gene West
(74) *Attorney, Agent, or Firm* — Henricks Slavin LLP

(57) ABSTRACT

A busbar (10) for an electric battery (20) for electrically connecting a plurality of individual cells (21) of the battery (20) comprises at least two conductor layers (Lu, Lo) stacked one on top of the other. The conductor layers (Lu, Lo) are electrically insulated from each other except at specific contact points (P1, P2). A bottom conductor layer (Lu) comprises, at a first end, a main terminal (T) for connecting a power supply. A top conductor layer (Lo) is electrically connected to the bottom conductor layer (Lu) via at least a first contact point (P1) and a second contact point (P2). The electrical resistance along a first current path between the main terminal (T) and the first contact point (P1) is the same as the electrical resistance along a second current path between the main terminal (T) and the second contact point (P2).

9 Claims, 4 Drawing Sheets

(51) Int. Cl.
*H01M 50/522* (2021.01)
*H01M 50/526* (2021.01)

(58) Field of Classification Search
USPC .......................................................... 429/163
See application file for complete search history.

(56) References Cited

U.S. PATENT DOCUMENTS

2017/0047572 A1* 2/2017 Biskup ................ H01M 10/625
2018/0330895 A1 11/2018 Nagayoshi et al.
2019/0304621 A1 10/2019 Velthuis et al.

OTHER PUBLICATIONS

International Search Report dated Mar. 1, 2021 for PCT App. Ser. No. PCT/EP2020/083472.
English language translation of Office Action dated Jun. 4, 2020 for German App. Ser. No. 10 2019 132 709.1.
Office Action dated Jul. 19, 2023 for Chinese App. Ser. No. 202080077433.0, with machine English translation.
Office Action dated Feb. 5, 2025 for EPO App. Ser. No. 20816427.7, with machine English translation.

* cited by examiner

BUSBAR FOR A BATTERY

The present invention relates to a busbar for an electric battery for electrically connecting a plurality of individual cells of the battery as well as to an electric battery with a plurality of individual cells and a busbar for electrically connecting the individual cells.

A generic battery particularly serves as an energy storage for supplying power to a building. Such a battery comprises a plurality of individual cells, preferably connected in parallel and/or in series. To achieve a uniform strain (charging and discharging) of the individual cells, ensuring a symmetric or homogenous, respectively, current distribution over the whole battery, that is over all individual cells, is necessary. Further, it is important to keep power dissipation as low as possible. An object to be solved by the invention consists in achieving a current distribution over the individual cells of the battery as homogenous as possible.

A cell connector for a battery comprising at least two electrically conducting foil layers stacked one on top of the other is described, for instance, in the German patent application DE 10 2013 213 540 A1. The cell connector comprises a relief shaft to avoid mechanical stresses between individual cells of the battery.

A busbar from multiple layers of metal sheets is disclosed in the U.S. Patent Application US 2019/304 621 A1.

The German patent application DE 10 2016 116 581 A1 discloses a connection plate for connecting battery cells for a battery. The connection plate is formed as a board with a not-conductive substrate, which may comprise multiple layers.

According to a first aspect of the invention, the object is solved by a busbar according to claim 1. According to a second aspect of the invention, the object is solved by an electric battery according to claim 9. Other aspects of the invention are the subject matter of the dependent claims, the drawings, and the following description of embodiments.

According to an aspect of the invention, a busbar for an electric battery for electrically connecting a plurality of individual cells of the battery comprises at least two conductor layers stacked one on top of the other. By the stacking of conductor layers, a mechanically stable construction may be achieved that is easy to be manufactured. A conductor layer especially has a rectangular cross section and has an elongated shape. That means especially that the length of a conductor layer is several times larger than the width of the conductor layer. Further, the width of the conductor layer is several times larger than the thickness of the conductor layer.

The conductor layers may preferably be realized by thin metal sheets. The conductor layers may for instance have a thickness of 1 to 3 mm.

The conductor layers are electrically insulated from each other except at specific contact points. The insulation may for instance be achieved through paint or through a non-conducting layer.

A bottom conductor layer, at a first end, has a main terminal for connecting a power supply. The main terminal may for instance be a terminal clamp or have bores, to which a power line may be connected. Thus, the bottom conductor layer serves to connect a power supply for charging the individual cells or for outputting a current from the individual cells, respectively.

A top conductor layer is electrically connected via at least a first contact point and a second contact point to the bottom conductor layer. The top conductor layer especially also serves for connecting the individual cells. For this purpose, the top conductor layer may be connected to a plurality of terminals or cell connectors, respectively.

The first contact point is arranged in a first third in a longitudinal direction of the busbar. The second contact point is arranged in a third third in a longitudinal direction of the busbar. The arrangement of the contact points in a longitudinal direction of the busbar leads to the possibility of achieving a homogenous current distribution along the whole length of the top conductor layer.

A current from the main terminal to the first contact point may flow in the longitudinal direction only with a reversal of direction. That is, the current initially flows starting from the main terminal in the positive direction along the longitudinal axis of the busbar and undergoes, in an area close to the center of the bottom conductor layer of the busbar, a reversal of direction, so that the current of the busbar continues to flow in the negative direction along the longitudinal axis, before the current path in the top conductor layer branches.

A current from the main terminal to the second contact point may flow in the longitudinal direction without a reversal of direction. However, the current path branches in the top conductor layer as well. The lengths of both described current paths from the main terminal to the first contact point or the second contact point, respectively, are about equal in size.

The electrical resistance along a first current path between the main terminal and the first contact point is the same as the electrical resistance along a second current path between the main terminal and the second contact point. As a result, also a current along the first current path equals a current along the second current path, so that a homogenous current distribution in the top conductor layer may be achieved.

Preferably, the at least two conductor layers stacked one on top of the other are electrically connected to each other at the contact points through at least one welding spot, respectively. By means of spot welding, the electrical contact between the bottom conductor layer and the top conductor layer may be created reproducibly and in an easy manner. However, other methods for the electrical contacting may be used as well.

In a preferred embodiment, the busbar comprises exactly two conductor layers. A busbar with only two conductor layers has an advantage that less members must be contacted with each other. Moreover, material and weight may be saved.

The at least one welding spot of the first contact point is preferably arranged at a peninsular cutout of the bottom conductor layer. The peninsular cutout insulates the welding spot or the first contact point, respectively, from an immediate environment on the bottom conductor layer. Thus, the peninsular cutout ensures that the first current path from the main terminal to the first contact point has the same impedance as the second current path from the main terminal to the second contact point.

The peninsular cutout preferably is electrically connected to an area of the bottom conductor layer between the first contact point and the second contact point, especially to an area in the center between the first contact point and the second contact point. Further, the peninsular cutout preferably extends in a longitudinal direction of the busbar. This arrangement leads to the current from the main terminal to the first contact point having to carry out a reversal of direction in the direction of the longitudinal axis.

The busbar comprises a lateral cantilever across the longitudinal direction on at least one of the contact points, thereby locally enlarging the width of the busbar, and may additionally be used as a detent.

Another preferable busbar comprises three conductor layers. In a configuration with three conductor layers, a first Y-shaped current branching may be provided at the transition between the bottom conductor layer and the middle conductor layer. Two further Y-shaped current branchings may be provided at the transition between the middle conductor layer and the top conductor layer. The Y-shaped current branchings are each generated at the contact points.

The top conductor layer is electrically connected by welding spots at the first contact point and the second contact point to the middle conductor layer. The electric connection may occur, for instance, by welding together the conductor layers. Otherwise, the layers are planarly insulated from each other.

The bottom conductor layer is electrically connected by welding spots at a third contact point to the middle conductor layer. The third contact point is arranged centered between the first contact point and the second contact point.

Preferably, the busbar is made integrally from a metal sheet and comprises three conductor layers. In an integral configuration of the busbar, the welding spots between the conductor layers may be forgone. Thus, the busbar may be manufactured particularly easily and cost-effectively.

The three conductor layers may be stacked one on top of the other by folding the metal sheet at connectors. The contact points are provided as connectors at the folds.

According to a further aspect of the invention, an electric battery with a plurality of individual cells comprises at least one busbar. The top conductor layer of the busbar comprises a plurality of cell connectors for electrically connecting the individual cells to the busbar. The cell connectors are arranged in equal intervals along a longitudinal direction of the busbar, so that each individual cell may be supplied with the same current when a power supply is applied to the main terminal of the busbar.

BRIEF DESCRIPTION OF THE FIGURES

In the following, further advantageous configurations are described in detail based on an embodiment depicted in the drawings, to which the invention is, however, not limited.

Schematically depicted are.

DETAILED DESCRIPTION OF THE INVENTION BASED ON EMBODIMENTS

Figure 1:
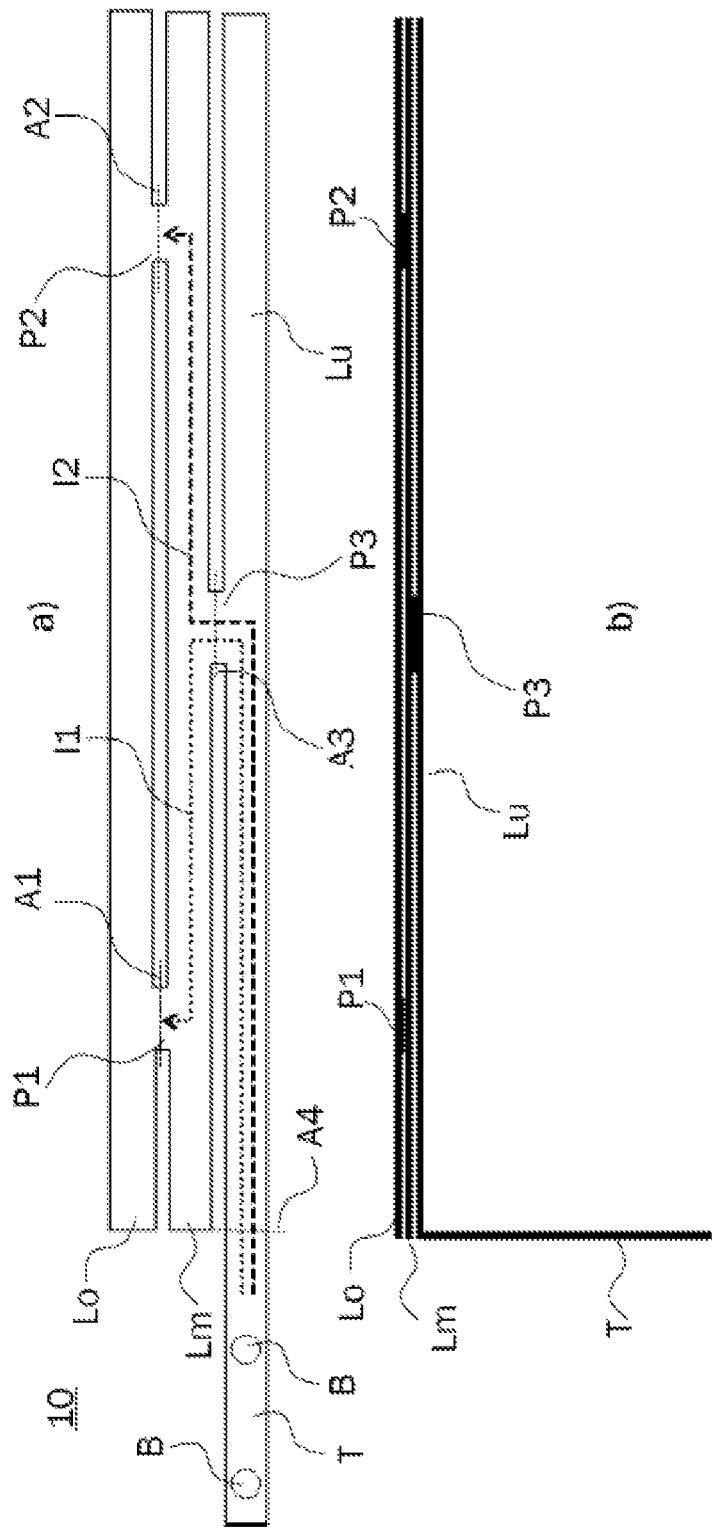
FIG. 1 shows a first embodiment of a busbar of the invention with three conductor layers (folded or welded).

In the following description of a preferable embodiment of the present invention, identical reference numerals denote identical or comparable components.

FIG. 1 shows a first embodiment of a busbar 10 for an electric battery 20 for electrically connecting a plurality of individual cells 21 of the battery 20. The busbar 10 is made integrally from a metal sheet and comprises three conductor layers Lu, Lm, Lo: a bottom conductor layer Lu, a middle conductor layer Lm, and a top conductor layer Lo.

FIG. 1a shows a state of the metal sheet after the shape of the conductor layers was cutout and before the busbar 10 has been brought to its finished shape by folding the metal sheet at the dash-marked folding points A1, A2, A3. At another folding point A4 of the bottom conductor layer Lu, the main terminal T of the busbar may be arranged rectangularly to the longitudinal direction of the busbar 10.

The three conductor layers Lu, Lm, Lo are stacked one on top of the other by folding the metal sheet at the three folding points A1, A2, A3. The folding points A1, A2, A3 are provided at connectors between the individual conductor layers Lu, Lm, Lo. The finished state of the busbar 10 is depicted in FIG. 1b as a side view. The connectors form the contact points P1, P2, P3 between the conductor layers Lu, Lm, Lo.

The main terminal T provided at a first end of the bottom conductor layer Lu comprises two bores B for mounting a line. A first current path I1 from the main terminal T to the first contact point P1 is marked in FIG. 1a as a dotted arrow. A second current path I2 from the main terminal T to the second contact point P2 is marked in FIG. 1n as a dashed arrow. Both arrows are about equal in length. In other words, both current paths are equally long.

As is well recognizable based on the marked current paths I1, I2, a current I1 flows from the main terminal T to the first contact point P1 with a reversal of direction in the longitudinal direction. The change of direction occurs at the third contact point P3. A current I2 from the main terminal T to the second contact point P2 may flow in the longitudinal direction without a reversal of direction. From both contact points P1, P2 in the top conductor layer Lo, the current may spread along the length of the top conductor layer Lo. Through the arrangement of the contact points, a homogenous current distribution may be achieved in the top conductor layer Lo.

As illustrated by FIG. 1, the first contact point P1 is arranged in a first third in a longitudinal direction of the busbar 10. The second contact point P2 is arranged in a third third in a longitudinal direction of the busbar 10.

The length of the busbar 10 may for instance be about 30 cm. The width of the busbar 10 may for instance be 10 to 15 mm. The thickness of the conductor layers Lu, Lm, Lo is for instance about 1 to 2 mm. These values are only exemplary specifications and depend on the dimension and the structure of the battery, for which the busbar 10 is provided.

The three conductor layers Lu, Lm, Lo are electrically insulated from each other except at specific contact points P1, P2, P3, for instance by the metal sheet being coated with an insulating paint.

The busbar 10 according to the first embodiment may achieve a uniform current distribution on the top conductor layer Lo and is, in this course, particularly easy and cost-effectively to manufacture from an integral metal sheet by folding the metal sheet. At the top conductor layer Lo, cell connectors may be contacted for connecting the individual cells of a battery, for example by welding together the cell connector with the top conductor layer Lo.

The busbar 10 according to the first embodiment may alternatively also be manufactured by spot welding, so that no folds are necessary. Such a busbar 10 is manufactured from three separate conductor layers. The top conductor layer Lo is electrically and mechanically connected to the middle conductor layer Lm by welding spots at the first contact point P1 and the second contact point P2. The bottom conductor layer Lu is electrically and mechanically connected to the middle conductor layer Lm by welding spots at a third contact point P3. Here, the third contact point P3 is arranged centered between the first contact point P1 and the second contact point P2, so that two equally long current paths arise from the main terminal T to the first contact point P1 and the second contact point P2, respectively. The finished busbar 10 functionally corresponds to the busbar 10 of the first embodiment. Instead of the connectors, the welding spots create an electrical and mechanical connection.

Figure 2:
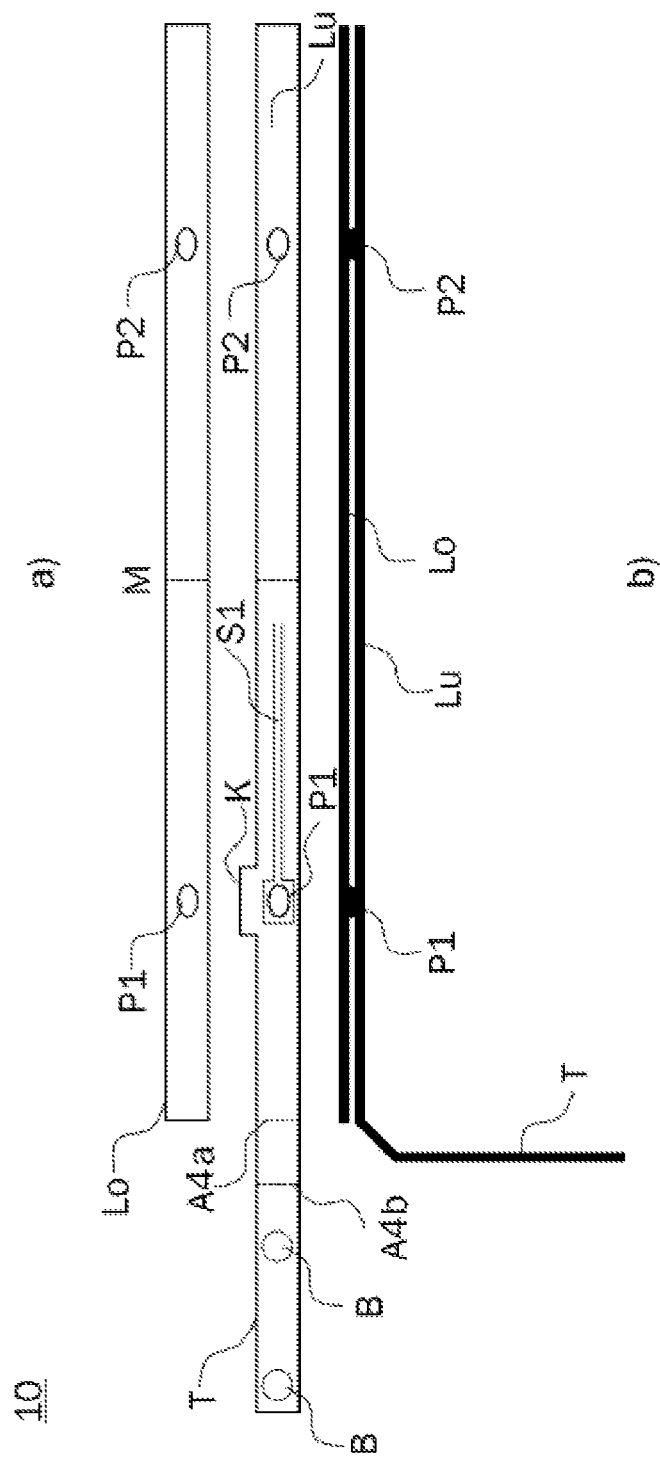
FIG. 2 shows a second embodiment of a busbar of the invention with two conductor layers.

FIG. 2 shows a second example of a busbar of the invention 10 with two conductor layers Lo and Lu. FIG. 2a shows both not yet connected conductor layers Lo and Lu in a top view. FIG. 2b shows a side view of the finished busbar 10 with the welded conductor layers Lo and Lu.

The top conductor layer Lo is electrically connected through a first contact point P1 and a second contact point P2 to the bottom conductor layer Lu with a welding spot, respectively. The welding spot of the first contact point P1 is arranged at a peninsular cutout S1 the bottom conductor layer Lu. This cutout S1 may for instance be made by laser cutting. By cutting it out, the peninsular cutout S1 is electrically insulated from its direct environment in the bottom conductor layer Lu. The peninsular cutout S1 is electrically connected to the centered area of the bottom conductor layer Lu between the first contact point P1 and the second contact point P2 close to the center M. As depicted in FIG. 2a, the peninsular cutout S1 extends in a longitudinal direction of the busbar 10.

The peninsular cutout S1 causes, as in the first embodiment, that a current from the main terminal T to the first contact point P1 may only flow in the direction of the longitudinal axis of the busbar 10 with a reversal of direction. A current from the main terminal T to the second contact point P2 may, in contrast, flow in a longitudinal direction without a reversal of direction. Thus, as in the busbar 10 according to the first embodiment, it is achieved that the electrical resistance along a first current path between the main terminal T and the first contact point P1 is equal to the electrical resistance along a second current path between the main terminal T and the second contact point P2. Thus, a homogenous current distribution may be provided on the top conductor layer Lo of the busbar 10 according to the second embodiment.

The busbar 10 comprises, at the first contact point P1, a lateral cantilever K across the longitudinal direction. Hereby, the width of the busbar 10 is locally enlarged. This cantilever K serves on one hand for mechanical stability and provides on the other hand an anchoring when mounting the busbar 10 in an electric battery 20.

Figure 3:
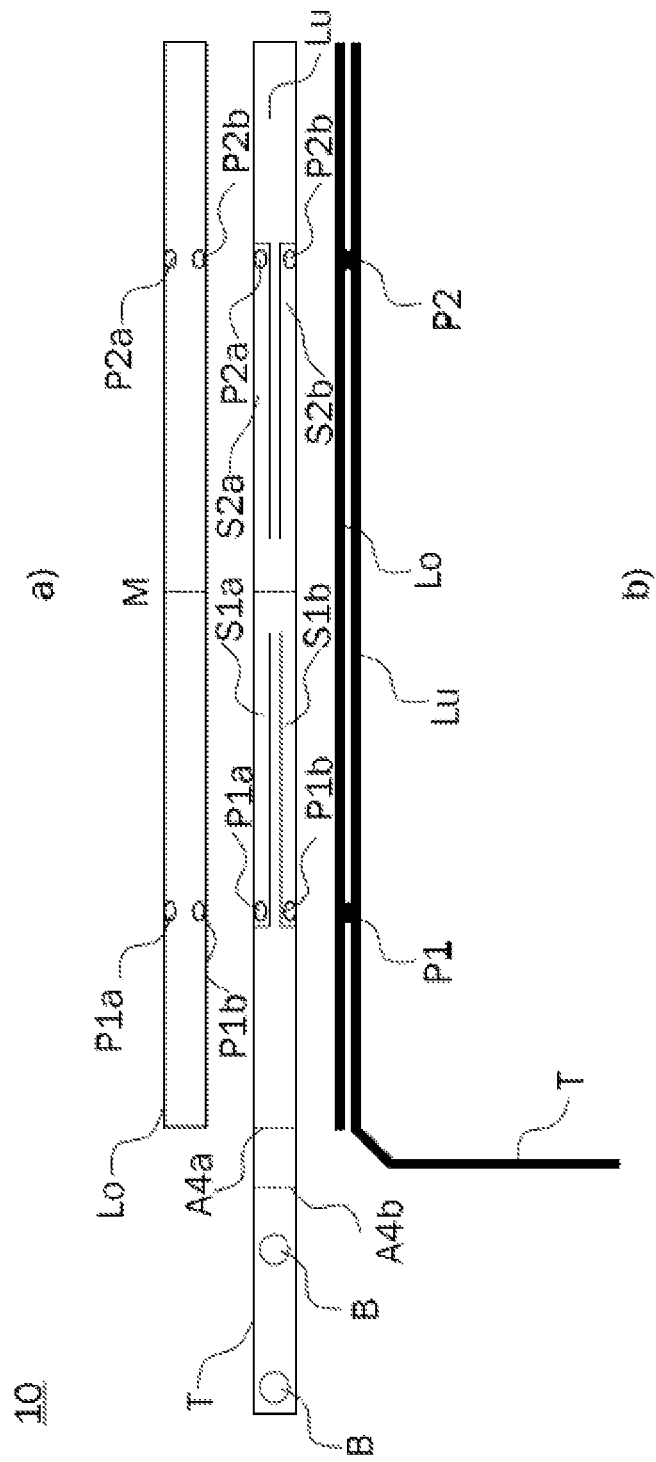
FIG. 3 shows a third embodiment of a busbar of the invention with two conductor layers.

Another embodiment of the busbar 10 is depicted in FIG. 3. This embodiment differs from the embodiment shown in FIG. 2 in that the top conductor layer Lo of the busbar 10 is connected through four welding spots P1a, P1b, P2a, P2b to the bottom conductor layer Lu of the busbar 10. The welding spots are arranged in pairs, respectively, with an identical interval to the marked center M. Further, each welding spot is arranged on its own cutout S1a, S1b, S2a, S2b. The cutouts S1a, S1b, S2a, S2b may, for instance, be made by laser cutting. By the cutouts, the welding spots P1a, P1b, P2a, P2b, respectively, are insulated from the environment on the conductor layer Lu.

Functionally, the third embodiment of the busbar 10 achieves the same effect as the first and second embodiments. The current path from the main terminal T to the four contact points and welding spots P1a, P1b, P2a, P2b, respectively, is equally large, respectively, so that a homogenous current distribution on the top conductor layer Lo may be achieved.

The structure in layers of the shown busbars 10 according to the embodiments with the described contacting causes a branching of the current path namely in two places. A first Y-shaped subdivision of the current is achieved in the second and third embodiments by the cutouts, especially by the first cutout S1, in the bottom conductor layer Lu. In the first embodiment, the Y-shaped subdivision of the current is achieved at the transition from the bottom conductor layer Lu to the middle conductor layer.

A second Y-shaped subdivision of the current is caused at the contact points P1, P2 to the top conductor layer. In the first embodiment, the second branching of the current paths is generated at both transitions from the middle conductor layer Lm to the top conductor layer Lo. In the second and third embodiments, the welding spots P1, P2 cause the second Y-shaped subdivision of the current. All embodiments have in common that, through the position of the contact points P1, P2 in the top conductor layer, a homogenous current distribution may be achieved.

Figure 4:
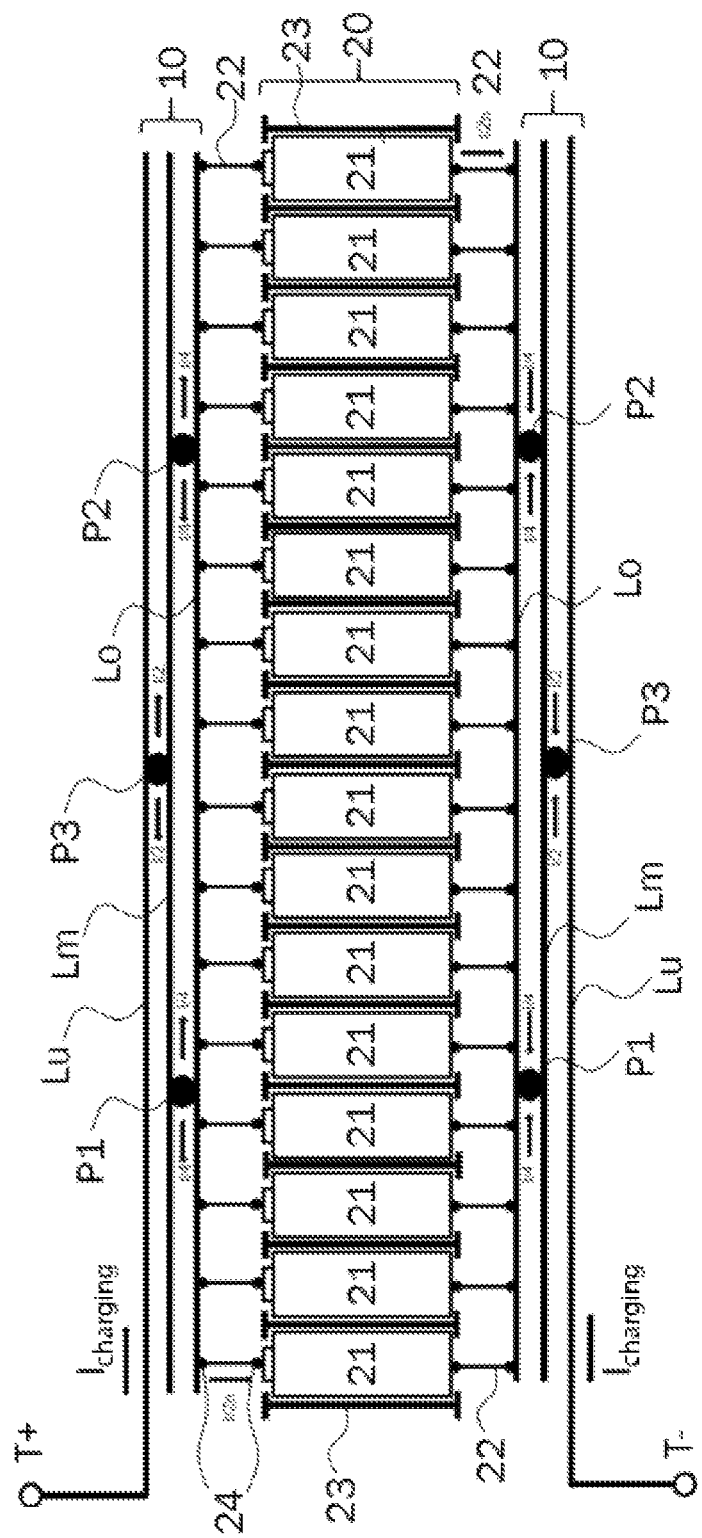
FIG. 4 shows a sectional view of an exemplary electric battery of the invention with busbars.

FIG. 4 shows a schematic sectional view of an exemplary electric battery of the invention 20 with a plurality of individual cells 21. The sectional view of FIG. 4 shows a row with sixteen individual cells 21. The individual cells 21 are held by cell carriers 23. For the sake of clarity, only both outer cell carriers 23 are provided with a reference numeral 23 in FIG. 4, respectively.

Each row of the battery 20 comprises two busbars 10 of the invention for electrically connecting the individual cells 21. A first busbar 10 serves for connecting the positive poles of the individual cells 21 and a second busbar 10 serves for connecting the negative poles of the individual cells 21. The busbar 10 is mounted at a support structure of the battery 20. This mounting is not explicitly depicted in FIG. 4. The main terminals T+ and T− of both busbars 10 are located at the left side of the image. A power line for charging or discharging the individual cells 21 may be connected to the main terminals T+ and T−, respectively.

The top conductor layers Lo of the busbars 10 are connected to the positive poles and negative poles of the individual cells 21 of the battery 20 through a plurality of cell connectors 22, respectively. The cell connectors 22 may, for instance, be electrically connected to the top conductor layer Lo through welding spots 24, respectively. For the sake of clarity, in FIG. 4, only both welding spots of the cell connector 22 on the top left are provided with reference numerals 24. The cell connectors 22 are arranged in equal intervals along a longitudinal direction of the busbar 10. For the sake of clarity, in FIG. 4, only one cell connector 22 per busbar 10 is provided with a reference numeral 22, respectively.

The busbars 10 may be connected through the main terminal T to a current supply, respectively, for charging and discharging the individual cells 21, respectively. As described above in the embodiments of the busbar 10, a homogenous current distribution is provided on the top conductor layer Lo of the busbar 10, so that the same current flows through each cell connector 22 to the respective individual cell 21.

When charging the battery 20, a current Icharging flows from the first main terminal T+ through the individual cells 21 to the second main terminal T−. As indicated in FIG. 4 by means of arrows, the current $I_{charging}$ is divided at the contact points P1, P2, P3. At the contact point P3 between the bottom conductor layer Lu and the middle conductor layer Lm, the charging current $I_{charging}$ branches, so that in the middle conductor layer Lm, half of a charging current I/2 continues to flow to the contact points P1, P2 between the middle conductor layer Lm and the top conductor layer Lo, respectively. At the contact points P1, P2 between the middle conductor layer Lm and the top conductor layer Lo, the charging current $I_{charging}$ branches again, so that a quarter of the charging current I/4 continues to flow in the top conductor layer Lo to the cell connectors 22, respectively. Then, a charging current I/Zn (indicated by an arrow at the first cell connector 22) flows through each cell connector 22, wherein Zn is the number of individual cells 21 per busbar 10. Therefore, in the example shown, a current I/16 flows to each individual cell 21, respectively.

From the negative poles of the individual cells 21, a current I/Zn (indicated by an arrow at the last cell connector 22) flows into the top conductor layer Lo of the second busbar 10, respectively. The currents I/Zn flow together at the contact points P1 and P2 between the top conductor layer Lo and the middle conductor layer Lm, so that in the middle conductor layer Lm, half of a charging current I/2 flows to the contact point P3 between the middle conductor layer Lm and the bottom conductor layer Lu, respectively.

The depiction of the current flow is to be understood purely schematically and serves only the purpose of Illustration. Current losses by the charging operation and the electrical resistance of the conductor, respectively, and other losses were not considered here.

The features disclosed in the above description, the claims, and the drawings may be of significance for realizing the invention in its different configurations both, individually as well as in arbitrary combinations.

The invention claimed is:

1. A busbar (10) for an electric battery (20) for electrically connecting a plurality of individual cells (21) of the battery (20), wherein
    the busbar (10) comprises at least two conductor layers (Lu, Lo) stacked one on top of the other;
    the conductor layers (Lu, Lo) are electrically insulated from each other except at specific contact points (P1, P2);
    a bottom conductor layer (Lu) comprises, at a first end, a main terminal (T) for connecting a power supply;
    a top conductor layer (Lo) is electrically connected to the bottom conductor layer (Lu) via at least a first contact point (P1) and a second contact point (P2); and
    the electrical resistance along a first current path between the main terminal (T) and the first contact point (P1) is the same as the electrical resistance along a second current path between the main terminal (T) and the second contact point (P2);
    wherein the at least two conductor layers (Lu, Lo) stacked one on top of the other are electrically connected at the contact points (P1, P2) through at least one welding spot, respectively.

2. The busbar (10) according to claim 1, wherein
    the first contact point (P1) is arranged in a first third in a longitudinal direction of the busbar (10); and
    the second contact point (P2) is arranged in a third third in a longitudinal direction of the busbar (10).

3. The busbar (10) according to claim 1, wherein
    a current from the main terminal (T) to the first contact point (P1) may flow in the longitudinal direction only with a reversal of direction; and
    a current from the main terminal (T) to the second contact point (P2) may flow in the longitudinal direction without a reversal of direction.

4. The busbar (10) according to claim 1, wherein the busbar (10) comprises exactly two conductor layers (Lu, Lo).

5. The busbar (10) according to claim 1, wherein the at least one welding spot of the first contact point (P1) is arranged on a peninsular cutout (S1) of the bottom conductor layer (Lu).

6. The busbar (10) according to claim 5, wherein the peninsular cutout (S1) is electrically connected to an area of the bottom conductor layer (Lu) between the first contact point (P1) and the second contact point (P2).

7. The busbar (10) according to claim 5, wherein the peninsular cutout (S1) extends in a longitudinal direction of the busbar (10).

8. The busbar (10) according to claim 1, wherein the busbar (10) comprises a lateral cantilever (K) across the longitudinal direction on at least one of the contact points (P1, P2), thereby locally enlarging the width of the busbar (10).

9. An electric battery (20) with a plurality of individual cells (21), wherein
    the battery (20) comprises at least one busbar (10) according to claim 1;
    the top conductor layer (Lo) of the busbar (10) comprises a plurality of cell connectors (22) for electrically connecting the individual cells (21) to the busbar (10); and
    the cell connectors (22) are arranged in equal intervals along a longitudinal direction of the busbar (10).

* * * * *